July 29, 1952  R. SWARTZ  2,605,455
BATTERY CHARGER
Filed March 8, 1950  2 SHEETS—SHEET 1
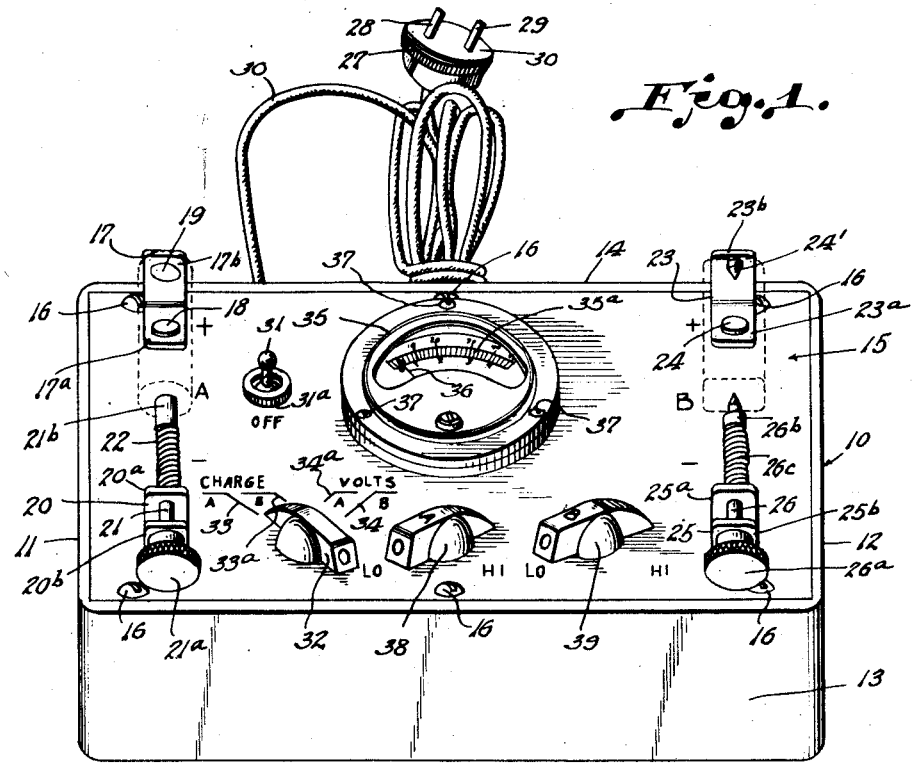
Fig. 1.
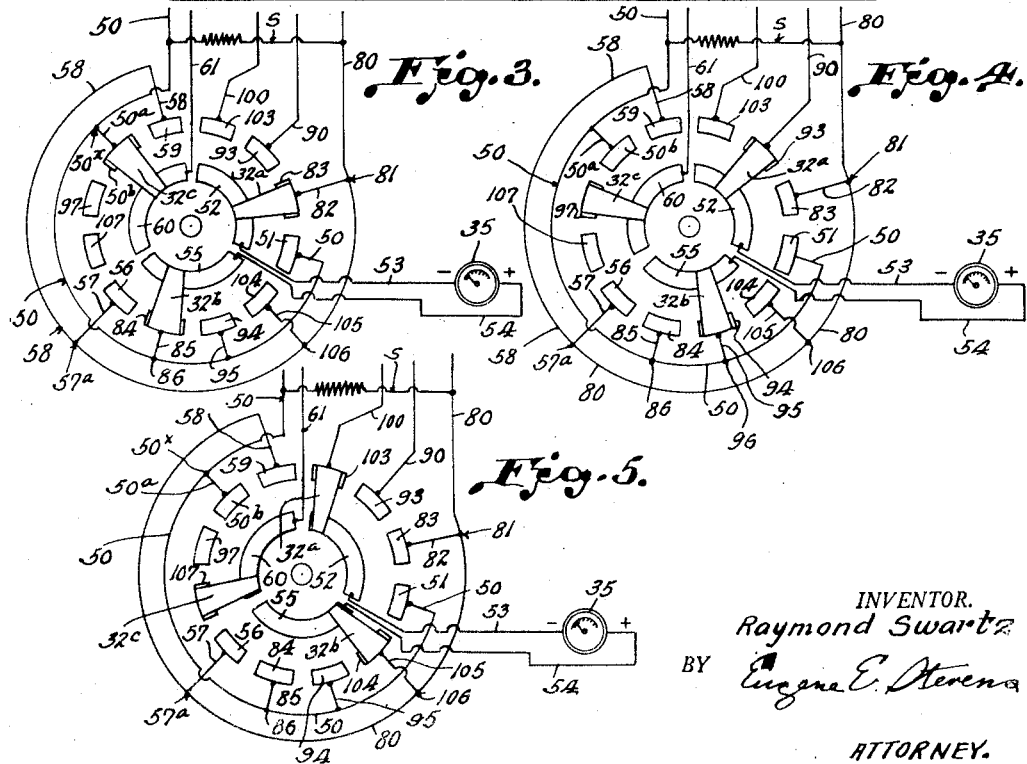
Fig. 3.  Fig. 4.
Fig. 5.
INVENTOR.
Raymond Swartz
BY Eugene E. Stevens
ATTORNEY.

Patented July 29, 1952

2,605,455

UNITED STATES PATENT OFFICE 2,605,455

BATTERY CHARGER

Raymond Swartz, Harrisburg, Pa.

Application March 8, 1950, Serial No. 148,400

9 Claims. (Cl. 320—4)

My invention relates to means for reconditioning or restoring electric batteries of the so-called "dry cell" type, and while it has particular reference to the single and multiple cell batteries used for hearing aids, it is of course suitable for charging or restoring dry cell and other batteries generally.

The usual dry cell battery is characterized by a zinc casing which forms the negative electrode while a carbon rod forms the positive electrode. Batteries of this type include a depolarizing material such as manganese dioxide. These batteries are short-lived and usually become exhausted or useless while the zinc container is still in good condition. It has been suggested that premature exhaustion of a battery of this type is caused by a chemical change within it, for instance, the change of manganese dioxide to manganese monoxide when the former is used as the depolarizing material. When this change has progressed to a certain point the battery is useless. Adherents to the above theory, to which I subscribe, claim that passage of D. C. electric current through the exhausted battery from the "plus" side thereof causes the manganese monoxide to be reoxidized and reconverted into manganese dioxide. In any event, it has been abundantly demonstrated in actual practice that passage of reverse direction D. C. current through an exhausted dry cell battery will restore it to normal, providing its zinc casing is in good condition and decomposition of the depolarizing material is not complete.

However, when recharging the battery, the voltage and amperage value of the current employed should not be high enough to cause the battery to heat up appreciably. Also, the voltage and amperage value of the charging current should preferably not materially exceed the original voltage and amperage output capacity of the battery.

Although prior art apparatus for recharging dry cells meets in many respects the requirements of flashlight users and those employing dry cell batteries of uniform voltage, it has fallen considerably short of the requirements of hearing aid users, and, for that matter, users of portable radios with self-contained batteries. The reason is that both hearing aids and portable radios involve the use of "A" and "B" batteries of widely different voltage (for instance, one and a half voltage "A" batteries and 15–45 volt "B" batteries), and no prior art development in the battery recharging field makes provision for the simultaneous recharging of batteries of different voltage.

It is, therefore, the primary object of my invention to provide a simple, compact recharging device which can be plugged into any 110 or 120 volt A. C. outlet, and employed for simultaneously recharging, say a 45 volt multiple cell "B" battery and a one and a half volt single cell "A" battery.

Also, the instant invention contemplates novel circuits and means whereby the values of the charging currents for the "A" and "B" batteries may be varied, and furthermore selectively read on a meter which is incorporated in the device without interruption of the charging operation.

Additionally, circuit means is included whereby the voltage of either the "A" battery or "B" battery can be selectively read without cutting off the charging current at its source.

Other objects and advantages of the invention will be readily understood and appreciated by those skilled in the art upon reference to the accompanying drawings in connection with the detailed description of the presently preferred embodiment of my inventive concept.

In the drawings, wherein the same reference characters have been used to designate the same parts throughout the several views, Fig. 1 is a perspective view of my battery recharging unit;

Fig. 3 is a partial wiring diagram showing the selector switch in the position for reading the value of the charging current for, for instance, a multiple cell "B" battery;

Figure 2:
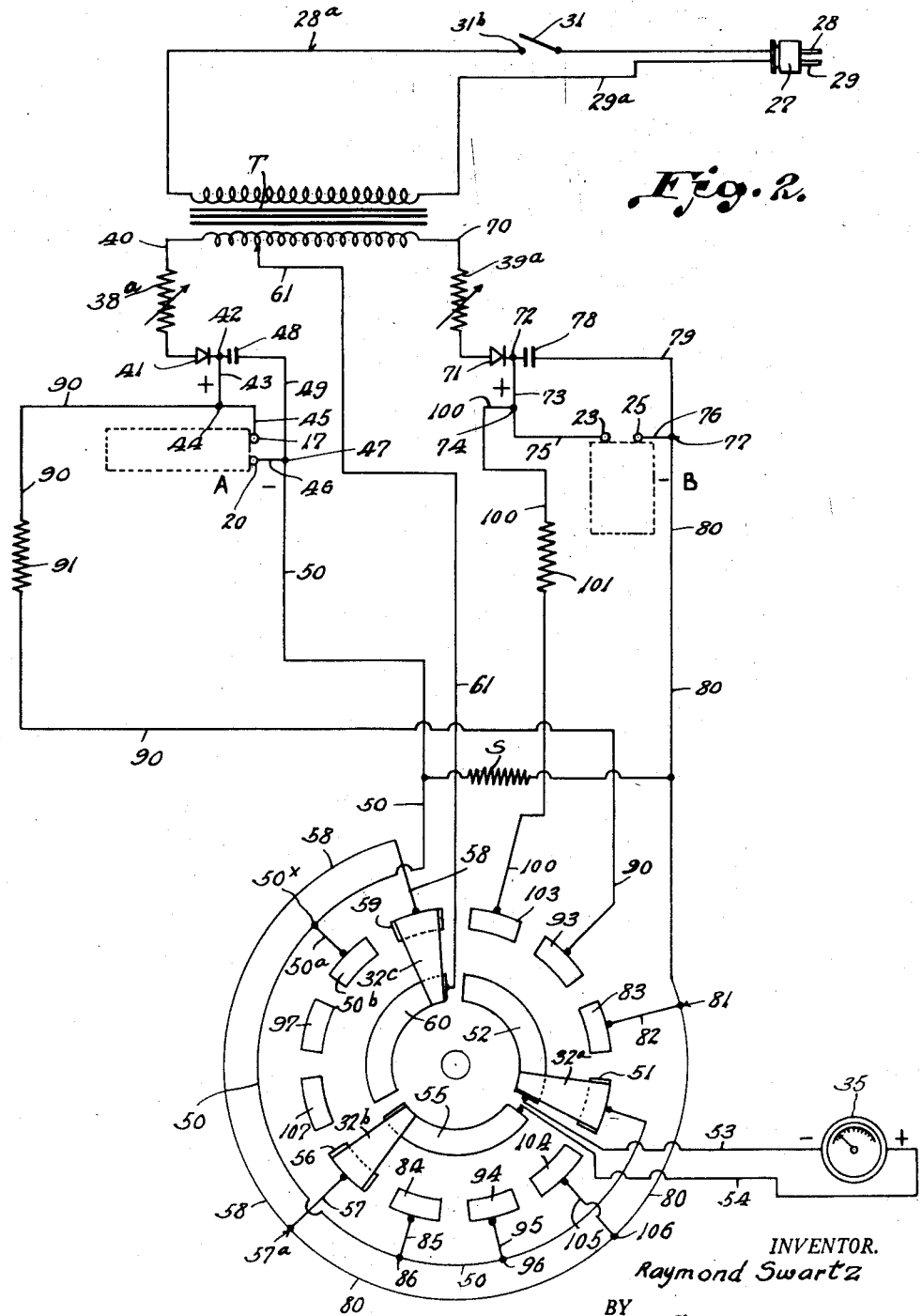
Fig. 2 is a diagram of the circuits.

Fig. 4 shows another position of the selector switch at which setting the charging current is cut off and the meter put in circuit with the "A" battery to indicate the voltage reading thereof; and Fig. 5 is another partial wiring diagram showing the fourth position of the selector switch at which setting the charging current is cut off and the meter put in circuit with the "B" battery for indicating the voltage output thereof.

Referring to the drawings by reference characters, numeral 10 indicates generally the case or housing for the apparatus, said housing preferably being closed at its bottom and having the end walls 11, 12, front wall 13, and rear wall 14. The housing as illustrated is rectangular in shape but it may, of course, take other form, the particular shape of the housing being immaterial.

The top of the housing is closed by an insulation material panel 15 and screws such as 16 secure said panel 15 in place in the usual manner, as for instance in the case of the removable instrument carrying panels of cabinet type radio sets.

As has doubtless been inferred from an inspection of Fig. 1 of the drawing, the top insulation material panel 15 of the casing 10 serves as a mount for a voltage registering meter 25, holders 17, 20, 21 and 24, 25, 26 for "A" and "B" batteries, respectively; and the various circuit control switches.

As pointed out in the introductory portion of the specification, my charger is adapted to simultaneously charge both single cell "A" and multiple cell "B" batteries, and the circuit arrangement is such that the selector switch 32 (to be referred to more in detail hereinafter) is adapted to be moved to various positions to cause the meter 35 to selectively indicate the milliampere value of the charging current for either the "A" or "B" battery. Said selector switch 32 is also movable to different relative positions for indicating the voltage charge in the "A" and "B" batteries being charged—and in the illustrated embodiment of the invention movement of the selector switch to either of the last mentioned positions automatically cuts off the flow of charging current to the batteries.

The holders for the "A" and "B" batteries are substantial duplicates but will be separately described, starting with the holder for the "A" battery, which holder is carried by the top panel 15 adjacent the left end wall 11 as viewed in Fig. 1.

The "A" battery holder comprehends the L-bracket 17 adjacent the rear wall 14 and its base portion 17a is secured to the panel 15 by means of a screw 18 or the like. In the drawing, the upstanding arm 17b of the bracket 17 has in its inner face, a recessed seat 19 for the projecting positive pole of the "A" battery.

The offset companion element of the "A" battery holder comprises a U-shaped bearing 20 secured to panel 15 adjacent the front wall 13 of casing 10, and its spaced upstanding arms 20a, 20 are provided with aligned bearing holes through which extend to the short rod or pin 21. Rod 21 has at its outer end the finger piece or head 21a adapted to bear against the front surface of the bearing arm 20b. The inner end of the rod 21 is provided with an enlargement providing the shoulder 21b, and the outer end of said shoulder-providing enlargement is adapted to bear against the bottom of the "A" battery casing which constitutes the battery "negative." Interposed between shoulder 21b and the outer face of the bearing bracket arm 20a is a compression spring 22 surrounding said rod 21. Thus, the tendency of the spring 22 is to force the shouldered end 21b of the rod 21 in the direction of the upstanding arm 17b of the bracket 17, so as to confine the "A" battery in place therebetween.

Turning now to the holder for the "B" battery, the angle piece 23 has its base portion 23a secured to panel 15 by a screw 24, and its upstanding arm 23b preferably has an inwardly pointed stud 24 directed toward the pointed and shouldered end 26b of a slide rod 26. Rod 26 operates in the aligned bearing holes of the upstanding arms 25a, 25b of the U-bracket 25 which is secured by screws or other means to the panel 15. A coil spring 26c on rod 26 bears against shoulder 26b and bearing arm 25a to normally urge rod 26 inwardly; and the outer end of rod 26 has its finger piece 26a.

Thus, as intimated, the "A" and "B" battery holders are substantial duplicates of one another. The battery engaging portion 24, 26b of the "B" battery holder are shown as being pointed because the conventional "B" battery for a hearing aid has small apertures in its ends. However, the battery engaging portions of the holders may take a variety of different forms, as will be appreciated.

Current may be supplied to my charger from the usual wall-carried "plug-in" electrical outlet which is provided in dwellings, Fig. 1 illustrating a conventional plug 27 having the laterally spaced prongs 28, 29 respectively, which project through the plug carried installation disc 30.

The wires 28, 29a from the respective plug prongs 28a, 29 are encased (30) as usual, and since most dwelling house current is of the alternating (A. C.) 110 volt type, said wires are connected to the transformer "T" as indicated in the wiring diagram, Fig. 2.

The various circuits will be described hereinafter, present reference being continued to Fig. 1.

As shown in Fig. 1, the base 31a of the usual tumbler cutoff switch 31 is secured to the top panel 15. When this switch is in the "off" position no current will be supplied to the unit from the plug 27.

Still referring to Fig. 1, numeral 32 indicates a four-way, three pole "selector" switch of known type, as will be understood from an inspection of the wiring diagram, Fig. 2. As indicated in Fig. 1, selector switch 32 is adapted to assume the four positions which are designated as at 33, 33a, and 34, 34a.

When the selector switch 32 is in either of the positions designated as at 33, 33a, both the "A" battery and "B" battery charging circuits (to be hereinafter referred to) will be closed and the "A" and "B" batteries will be subjected to charging current. However, when the selector switch is in the position indicated at 33, the value of the charging current going to the "A" battery will be registered on the milliammeter 35 also carried by the top panel 15; and when the selector switch is in the position indicated by reference character 33a the charging current supplied to the "B" battery will be registered on the milliammeter 35.

The other two positions of the selector switch 32 which are indicated in Fig. 1, namely, the 34, 34a positions are employed for obtaining a reading on the meter 35 of the voltage rating of the "A" and "B" batteries, respectively. When selector switch is in either of the 34, 34a positions it automatically cuts off the flow of charging current to the batteries, thus assuming accurate battery output readings without the necessity of breaking the circuit to transformer "T" at switch 31.

Referring to the voltage meter 35 to which incidental reference has been made hereinabove, said meter is a conventional milliammeter whose frame is secured to the panel 15 as is customary by means of screws 37.

The milliammeter 35 has the scale 35a graduated to indicate up to 50 volts (see top figures) and up to 5 volts (as when the "A" battery reading is to be taken) see lower figures. The pointer of the voltmeter is indicated at 36.

And, finally, the top closure panel 15 of the casing 10 provides the control knobs 38, 39 respectively, for the rheostats (adjustable resistors) 38a, 39a shown in the wiring diagram, Fig. 2. Rheostat 38a is included in the "A" battery charging circuit and rheostat 39a is included in the "B" battery charging circuit. The rheostats 38a, 39a will be adjusted so that the unit will charge, for instance, a 1½ volt capacity "A"

battery, and at the same time, a 45 volt capacity "B" battery.

*The 33 (Fig. 1) position of selector switch meter in "A" battery charging circuit*

Referring to Fig. 2, the "3 pole four position" selector switch 32 provides the simultaneously shiftable circumferentially spaced bridging elements 32a, 32b, 32c, and the inner series of three circumferentially spaced arcuate contacts (poles or decks) 52, 55 and 60, as shown. The bridging elements 32a, 32b, 32c of selector switch 32 are adapted to be shifted to connect various ones of the circumferentially spaced outer series of selector switch contacts 50b, 51, 56, 59, 83, 84, 93, 94, 97, 103, 104, and 107 with various ones of said inner series of contacts 52, 55, to establish various circuits, as will be presently explained.

In the position of the selector switch as shown in Fig. 2, the switch is at the 33 position indicated in Fig. 1, in which position the "A" and "B" batteries are being charged and the "A" battery charging circuit includes the meter 35 to indicate the milliampere value of the "A" battery charging current.

As shown in Fig. 2, the "A" battery charging current passes from the output side of the transformer "T" by way of the wire 40 to the adjustable resistor or rheostat 38a which is set to supply current of desired voltage to the "A" battery by way of the rectifier 41, contact point 42, wire 43, contact point 44, and wire 45, which latter is connected to the "A" battery holding bracket 17 of Fig. 1. The current passes from 17 through the "A" battery and out through the terminal 20 thereof through wire 46 to the connection 47 with wire 50.

It should be mentioned here that a condenser 48 is connected to contact 42 and contact 47 through 49.

The charging current from the transformer after passing through the "A" battery continues by way of line 50 to the fixed contact 51 of the selector switch, it being noted that the movable bridging element 32a of said switch is in contact with the outer fixed switch segment 51, and also with the inner arcuate fixed segment 52 of said switch. A current supply wire 53 leads from the inner arcuate segment 52 of the switch to one side of the meter 35 while the other side of the meter 35 has the return wire 54 which is connected to the fixed arcuate switch contact 55 which is circumferentially spaced from the aforementioned inner arcuate switch contact 52. A shunt S connected to line 50 from the "A" battery and the line 80 (to be referred to later) from the "B" battery by-passes nine tenths of the current flow away from the meter circuit 53, 54 so as to admit of the use of an inexpensive low capacity meter 35 (for instance, a sensitive 0-5 milliammeter, as shown).

From contact 55 the battery charging current passes by way of the bridging switch element 32b to the outer fixed contact 56 of said switch; and from thence to the point 57a to which is connected the circuit line 58 leading to fixed switch contact 59. This contact 59 and the third inner arcuate contact 60 are illustrated as being bridged by the third shiftable bridging element 31c of the selector switch 32. Thus, current passes from 59 through 32c to 60. A common current return line 61 leads from the fixed switch contact 60 and has connection with the transformer as indicated.

*The "B" battery charging circuit (meter omitted)*

Still referring to Fig. 2 of the drawings (the selector switch 32 remaining at the 33 position of Fig. 1) the charging current for the "B" battery passes from the transformer by way of line 70 to the adjustable resistor or rheostat 39a and thence through the rectifier 71 and to the L-bracket 23 of the "B" battery holder by way of wire 73, contact 74, and wire 75.

The current passes through the "B" battery and from the battery holder element 25 by way of line 76 to the contact 77; and thence by way of line 80 to point 57a to which the aforementioned wire 58 is connected. The "B" battery current follows the wire 58 to the return line 61 by way of fixed contacts 59 and the bridging element 32c, the common return line 61 leading to the transformer as previously indicated.

*The 33a (Fig. 1) position of the selector switch ("A" and "B" batteries being charged and meter included in the "B" battery charging circuit)*

Turning to Fig. 3 of the drawings, it will be noted that the selector switch knob has been turned to the 33a position indicated in Fig. 1. In this position bridging member 32a connects outer fixed switch contact 83 with the inner contact 52 while the bridging element 32b connects outer fixed contact 84 with fixed inner arcuate contact 55; and the third bridging element 32c connects outer fixed contact 50b with inner arcuate contact 60.

Thus, the charging current from the "A" battery line 50 passes from point 50x in line 50 by way of connection 50a to the outer fixed contact 50b of the switch; and thence by way of bridging element 32c to the inner fixed arcuate element 60 and thence back to the transformer by way of line 61.

Now as to the path of the charging current for the "B" battery when the selector switch 32 is in the Fig. 3 position, such current (or rather, the unshunted $\frac{1}{10}$ of it) passes from point 81 in line 80 by way of the wire 82 to the outer fixed contact 83 of the selector switch 32; and thence by way of bridging element 32a to the inner arcuate contact 52 of said switch. From fixed switch contact 52 said $\frac{1}{10}$ of the "B" battery charging current passes through the meter by way of lines 53, 54; and thence to arcuate contact 55, and across to fixed switch contact 84 by way of bridging element 32b. From 84 the current goes back to the common return line 61 by way of 85 and 50, to 50x and thence by way of 50a, 50b, 32c and 60 to return line 61 and transformer "T." As will be understood from Figs. 2 and 3, the shunt S operates in the Fig. 3 position of the selector switch to pass $\frac{9}{10}$ of the "B" battery charging current flow back to the transformer by way of 50, 50a, 32c, 60 and 61.

*The "A" battery voltage indicating circuit (Fig. 4)—battery charging circuits open*

Referring to Fig. 1, when the selector switch 32 is in its third, or 34a, position, the bridging elements 32a, 32b and 32c will be positioned as indicated in Fig. 4 and both charging circuits and the "A" battery output circuit will be open. Thus, the current flows from the plus side 17 of the "A" battery through the line 45, 44, 90 and fixed resistor 91 to the outer fixed contact 93 of the selector switch 32. From the contact 93 the current flows across the bridging element 32a to the inner arcuate contact 52 of the switch and thence through the meter circuit 53, 54 to the inner arcuate switch contact 55. From inner switch contact 55 the current passes back to the minus side of the "A" battery by way of bridging member 32b, outer fixed switch contact 94, line 95 and the line 50, 46 (which latter, as will be remembered, forms a part of the "A" battery charging circuit when the latter is closed as in Figs. 2 and 3).

Inasmuch as the meter 35 is adapted to handle only low voltage current, and since the shunt S is not in the "A" battery voltage output circuit, I provide the earlier mentioned resistor 91 in the "A" battery output line 90 to reduce the current supply to the meter 35 to a value which it can handle.

In this Fig. 4 position of the selector switch, it will be noted that the "A" battery charging circuit is open since the bridging element 32c is not in contact with the outer fixed contact 59 of the switch 32 which leaves no circuit back to the common return line 61 to transformer "T."

Similarly, the "A" battery charging circuit is open, there being no electrical connection between charging line 50 and the return line 61 to the transformer.

The "B" battery voltage indicating circuit (Fig. 5), the charging circuits being open Referring to Fig. 1, the selector switch in this Fig. 5 position is turned to the indicating line 34. In this Fig. 5 switch position the bridging element 32a connects the outer contact 103 with the inner contact 52 while the bridging element 32b connects contacts 104 and 55 and the third bridging element 32c connects contact 60 with the "dead end" outer fixed switch contact 107. Thus, the "A" and "B" battery charging circuits are open by reason of the fact that there is no electrical connection between the respective output lines 50 and 80 and the common return line 61 to the transformer "T."

The "A" battery output circuit is also open due to the unbridged gap between fixed switch contacts 93 and 52.

However, in this Fig. 5 switch position current flows from the "B" battery by way of the line 75 from the holder element 23 and through line 100 and resistor 101 to the meter 35 by way of 103, 32a, 52 and 53; and then back to the minus side of the "B" battery through 54, 55, 32b, 105, and thence by way of 54, 55, 32b, 104, 105 and charging line 80.

Having thus described my invention, what I claim is:

1. Apparatus for simultaneously reconditioning at least two dry cell batteries of different current output capacity and comprising, a source of electric current of a voltage value at least equal to the voltage output capacity of the more powerful one of the batteries to be reconditioned, separate charging lines for the respective batteries and connected to said current source, battery holders included in each charging line and adapted to retain said batteries in place for the passage of charging current therethrough, an adjustable resistor in each charging line between said current source and the battery holder, charging current return line means connected to said charging lines and to said current source, switching means operable to connect said charging lines to said return line means, a current value-indicating meter, a branch circuit including said meter, and means incorporated in said switching means for selectively including said meter-including branch circuit in said respective charging circuits for indicating the current value of same and without interrupting the current flow in the other charging circuit.

2. Apparatus for simultaneously reconditioning at least two dry cell batteries of different current output capacity and comprising, a source of electric current of a voltage value at least equal to the voltage output capacity of the more powerful one of the batteries to be reconditioned, separate charging lines for the respective batteries and connected to said current source, battery holders included in each charging line and adapted to retain said batteries in place for the passage of charging current therethrough, an adjustable resistor in each charging line between said current source and the battery holder, charging current return line means connected to said charging lines and to said current source, switching means operable to connect said charging lines to said return line means, a current value-indicating meter, a branch circuit including said meter, means incorporated in said switching means for selectively including said meter-including branch circuit in said respective charging circuits for indicating the current value of same and without interrupting the current flow in the other charging circuit, separate battery current output circuits including said respective battery holders, said aforementioned switching means and portions of the respective charging lines at the switching means side of said battery holders being incorporated in said respective battery current output circuits, and said switching means having portions for selectively closing the respective battery output circuits and including the meter-incorporating branch circuit therein while simultaneously opening said respective charging circuits.

3. Apparatus for simultaneously reconditioning at least two dry cell batteries of different voltage output capacity and comprising, a transformer adapted to be connected to a source of electric current, separate charging lines for the respective batteries and connected to the output side of said transformer, battery holders included in each charging line and adapted to hold said batteries in place for the passage of charging current therethrough, an adjustable resistor in each charging line between said transformer and the battery holder, charging current return line means connected to said charging lines and to said transformer, a current-value registering meter and a normally open branch circuit therefor, each of said charging lines having a gap therein short of said return line means and beyond its battery holder, said gaps being adjacent said meter-including branch circuit, separate battery current output circuits including said respective battery holders and having gaps adjacent said charging circuit gaps, said battery current output circuits including the portions of the respective charging current lines between the battery holders and said charging line gaps, switching means operable to simultaneously close said charging line gaps, other switching means operable to selectively include said meter-including branch line in said respective charging circuits, additional switching means for selectively closing said battery current output circuits, and switching means for selectively including said meter-including branch circuit in said battery current output circuits.

4. Apparatus for simultaneously reconditioning at least two dry cell batteries of different voltage output capacity and comprising a source of current, separate battery charging circuits connected to said current source and including return line means thereto, a circuit gap providing battery holder in each charging circuit for retaining a battery for the passage of charging current therethrough, an adjustable resistor in each charging circuit between the current source and its battery holder whereby to vary the value of the charging current a current value-indicating meter and a branch circuit therefor, and switching means for selectively connecting said meter-including branch circuit to said charging circuits.

5. The combination set forth in claim 4, and a resistance wire-including shunt connecting lines of said battery-charging circuits at points between said battery holders and said switching means, said shunt being calibrated to divert from said meter-including branch circuit a predetermined percentage of the voltage of the charging current from whichever charging circuit includes the meter.

6. Apparatus for simultaneously reconditioning at least two dry cell batteries of different voltage output capacity and comprising a source of current, separate battery charging circuits connected to said current source and including return line means thereto, a circuit gap providing battery holder in each charging circuit for retaining a battery for the passage of charging current therethrough, an adjustable resistor in each charging circuit between the current source and its battery holder whereby to vary the value of the charging current a current value-indicating meter and a branch circuit therefor, separate normally open battery output current circuits, including said respective battery holders, each of said battery output current circuits including a portion of the corresponding charging current circuits, and switching means for selectively closing said battery output circuits while including the meter circuit therein and opening said battery charging circuits.

7. The combination set forth in claim 6, and said switching means being operable in other positions to selectively include said meter in said charging circuits while leaving said battery output circuits open.

8. The combination set forth in claim 6, and said switching means being operable in other positions to selectively include said meter in said charging circuits while leaving said battery output circuits open, and a resistance wire-including shunt connecting lines of said battery-charging circuits at points between said battery holders and said switching means, said shunt being calibrated to divert from said meter-including branch circuit a predetermined percentage of the voltage of the charging current from whichever charging circuit includes the meter.

9. Apparatus for simultaneously reconditioning dry cells of different current output capacity (for instance, "A" and "B" batteries) and comprising, a source of A. C. electric current, a transformer electrically connected to said current source, separate "A" and "B" battery charging lines connected to the current output side of said transformer, battery holders included in each charging line and adapted to retain batteries of different current ouput capacity for passage of charging current therethrough, and adjustable resistor and a current rectifier in each charging line between its battery holder and the transformer for changing the A. C. current to D. C. current, charging current return line means connected to same charging lines and to said transformer and switching means operable to connect said battery charging lines to said transformer return line means, a current value-indicating meter, a branch circuit including said meter, said meter-including branch circuit, the switching means, and said two charging lines being operatively related whereby said meter-including branch circuit will be selectively included in the respective charging circuits upon manipulation of said switching means to different positions.

RAYMOND SWARTZ.

REFERENCES CITED

The following references are of record in the file of this patent:

UNITED STATES PATENTS

| Number | Name | Date |
|---|---|---|
| 972,210 | Motsinger | Oct. 11, 1910 |
| 1,227,789 | Horton | May 29, 1917 |
| 1,623,628 | Lovejoy | Apr. 5, 1927 |
| 1,808,941 | Van Dyck | June 9, 1931 |
| 1,934,692 | Bellamy | Nov. 14, 1933 |
| 2,000,571 | Oswald | May 7, 1935 |
| 2,036,547 | Siemon | Apr. 7, 1936 |
| 2,222,196 | Vilkomerson | Nov. 19, 1940 |
| 2,347,452 | Amsden | Apr. 25, 1944 |
| 2,418,141 | Salazar | Apr. 1, 1947 |
| 2,453,960 | Arvidsson | Nov. 16, 1948 |